United States Patent
Ramirez Alvarez et al.

(10) Patent No.: US 10,815,548 B2
(45) Date of Patent: Oct. 27, 2020

(54) METHOD FOR PRODUCING BRIQUETTES FROM PELLET FINES, DRI SLUDGE, DRI FINES AND DUST FROM DRI DEDUSTING SYSTEMS, FOR INDUSTRIAL USE IN DIRECT-REDUCED IRON PRODUCTION PROCESSES

(71) Applicant: D R&D Labs and Engineering S. DE R. L. DE C. V., San Pedro Garza Garcia (MX)

(72) Inventors: Francisco Javier Ramirez Alvarez, Fraccionamiento Puerto Nuevo (MX); Francisco Javier Palafox Sanchez, Fraccionamiento Tulipanes (MX)

(73) Assignee: D R&D Labs and Engineering S. DE R. L. DE C.V, San Agustín, San Pedro Garza Garciía, Nuevo León (MX)

( * ) Notice: Subject to any disclaimer, the term of this patent is extended or adjusted under 35 U.S.C. 154(b) by 287 days.

(21) Appl. No.: 15/612,577

(22) Filed: Jun. 2, 2017

(65) Prior Publication Data
US 2017/0268079 A1    Sep. 21, 2017

Related U.S. Application Data

(63) Continuation-in-part of application No. PCT/MX2015/000110, filed on Jul. 24, 2015.

(30) Foreign Application Priority Data

Dec. 3, 2014 (MX) ........................ A/2014/014746

(51) Int. Cl.
C22B 1/243 (2006.01)
C22B 1/24 (2006.01)
C22B 1/242 (2006.01)

(52) U.S. Cl.
CPC ............. *C22B 1/243* (2013.01); *C22B 1/242* (2013.01); *C22B 1/2406* (2013.01); *C22B 1/2413* (2013.01)

(58) Field of Classification Search
CPC ....... C22B 1/2406; C22B 1/242; C22B 1/243; C22B 1/2413
See application file for complete search history.

(56) References Cited

U.S. PATENT DOCUMENTS 2,865,731 A   12/1958   Crowe
3,125,437 A   3/1964    Moore et al.
(Continued)

FOREIGN PATENT DOCUMENTS

GB    2043613 A   * 10/1980   ......... C21B 13/0046
KR    100797839   * 12/2006
WO    WO2016/089192 A1 † 6/2016

OTHER PUBLICATIONS

KR 100797839 machine translation (Year: 2006).*
(Continued)

*Primary Examiner* — Tima M. McGuthry-Banks
(74) *Attorney, Agent, or Firm* — Rankin, Hill & Clark LLP

(57) ABSTRACT

A method for producing briquettes from pellet fines, DRI sludge, DRI fines and dust from DRI dedusting systems and, in this way, reincorporating same into steel production processes, thereby contributing to the re-use of the by-products of these processes, as well as minimizing the stocks of these types of materials and, consequently, helping to improve the environment. The invention comprises: grinding and sieving the pellet fines and the DRI sludge; sieving the DRI fines; storing the dust from DRI dedusting systems; briquetting with roller presses, using liquid sodium silicate and bentonite or composite Portland cement as binders; sieving the briquettes; shredding the edges and waste of the
(Continued)

fresh briquettes; and curing in order to improve the physical properties thereof, such as strength. Once cured, the fresh briquette can be stored or sent directly to direct-reduced iron production processes for use as part of the feedstock for reduction ovens or reactors.

9 Claims, 1 Drawing Sheet

(56) References Cited

U.S. PATENT DOCUMENTS

| | | | |
|---|---|---|---|
| 3,948,638 A * | 4/1976 | Pietsch | C22B 1/24 75/10.34 |
| 4,032,352 A * | 6/1977 | Pietsch | C04B 28/26 106/613 |
| 4,116,679 A † | 9/1978 | Pietsch | |
| 4,585,475 A | 4/1986 | Fosnacht | |
| 4,917,723 A | 4/1990 | Coyne, Jr. | |
| 5,630,202 A * | 5/1997 | Bergendahl | B30B 11/16 419/66 |
| 9,011,573 B2 * | 4/2015 | Ahsan | C21B 13/0046 148/579 |
| 2005/0050996 A1 | 3/2005 | Gannon et al. | |
| 2009/0169413 A1 | 7/2009 | Ahsan et al. | |
| 2012/0210824 A1 | 8/2012 | Lehtinen et al. | |
| 2013/0032005 A1 * | 2/2013 | Boehm | C21B 13/00 75/319 |

OTHER PUBLICATIONS

IPRP (International Preliminary Report on Patentability) for PCT/MX2015/000110.†

Claims from WO 2016/089192 (publication of PCT/MX2015/000110).†

\* cited by examiner

† cited by third party

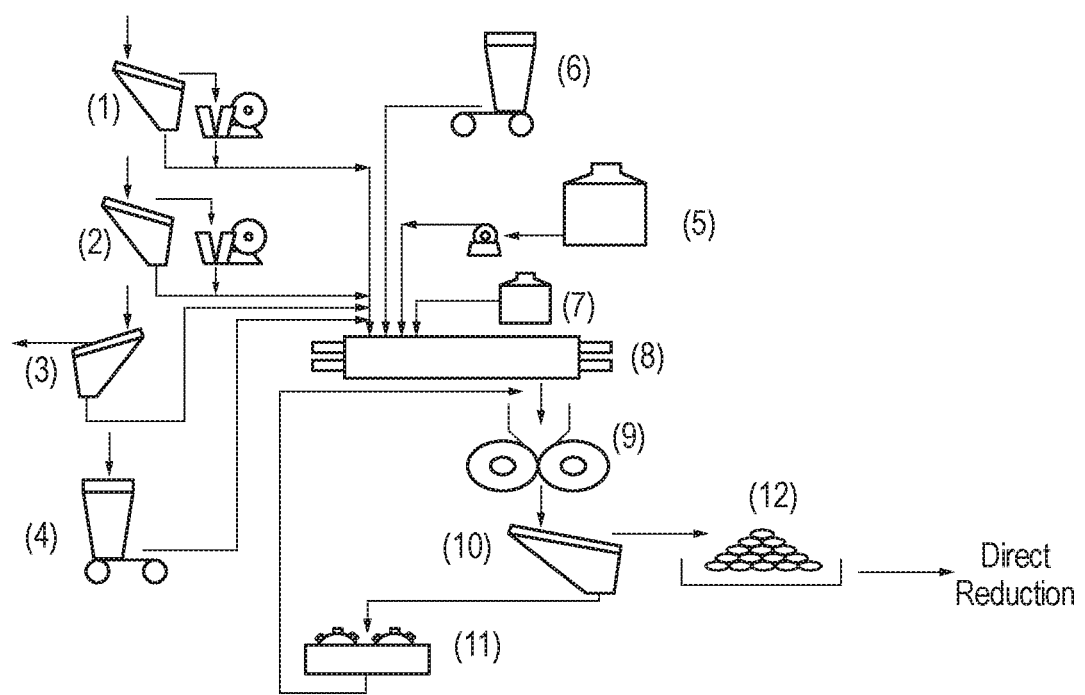

METHOD FOR PRODUCING BRIQUETTES FROM PELLET FINES, DRI SLUDGE, DRI FINES AND DUST FROM DRI DEDUSTING SYSTEMS, FOR INDUSTRIAL USE IN DIRECT-REDUCED IRON PRODUCTION PROCESSES

CROSS-REFERENCE TO RELATED APPLICATIONS

This application is a continuation-in-part of International Application No. PCT/MX2015/000110, filed Jul. 24, 2015, and claims priority to Mexico Pat. App. No. MX/a/2014/014746, filed Dec. 3, 2014.

OBJECT OF THE INVENTION

To establish a process by which briquettes for industrial use are obtained from pellet fines, DRI sludge, DRI fines and dusts of DRI dedusting systems in order to reincorporate them to the processes of Direct Reduction iron production, contributing to the reuse of the byproducts generated by these processes, while minimizing inventories of this type of materials with the consequent contribution to improving the environment.

BACKGROUND OF INVENTION

The briquetting process consists in agglomerating the materials by compression using roller presses in which, depending on the characteristics of the materials, the use of binders will be necessary to help form a briquette that meets the characteristics of strength needed for handling in subsequent processes.

The dimensions and shape of the briquette also depend on the end use.

There are processes for manufacturing briquettes from various by-product materials of the steel companies that, unlike the current ones, are used as they are generated to increase productions (briquettes from sponge iron fines) or to generate energy (briquettes from coal fines) in the steel industry processes. There are also processes for manufacturing briquettes from pellet fines and iron ore fines for use in horizontal reduction reactors.

The patent with registration number EP 1425427 A4 which describes a method for producing cooked briquettes for use as load in Blast Furnaces or Direct Reduction Furnaces from the mixture of hydrated iron mineral and fluxes, being Goethite the preferred iron ore and limestone the preferred fluxes, which makes the difference with respect to the present invention where pellet fines, DRI sludge, DRI fines and dusts from DRI dedusting systems are used, and no limestone is added. The decoction of briquettes from the referred patent is to cure them and ease their handling using decoction furnaces with temperatures of at least 1200° C. and more, preferably at least 1380° C. for at least 15 minutes, which makes the difference with respect to the present invention where the curing of the briquette is achieved with curing at room temperature.

U.S. Pat. No. 2,865,731 A which describes a method for producing cylindrical briquettes with a hydraulic piston from iron ore and paper pulp as binder, being the iron ore flotation concentrates of hematite which makes the difference from the present invention where pellet fines, DRI sludge, DRI fines and dusts from DRI dedusting systems are used using inorganic binders to form the briquette in roller press.

U.S. Pat. No. 3,125,437 A which describes a method for briquetting iron ore using partially reduced hematite fines by a reducing agent at temperatures below 1500° F. to then briquette them at hot temperatures between 700 and 1300° F. which makes the difference from the present invention where pellet fines, DRI sludge, DRI fines and dusts from DRI dedusting systems are used using organic binders to form the briquette in roller press at room temperature.

Patent US 2012/0210824 A1 which describes a method for producing cold cured binders in the form of pellets or micropellets in a pelletizing disc or drum from iron ore with fine particle size preferably 80% below mesh 325 or also using byproducts of the steel industry such as EAF and BOF dusts, sinter feed or sinter fines, or iron ore concentrate fines using Portland cement or clinker as binders, or organic binders such as acrylamides or carboxymethylcelluloses, and having the synthesizing plants as end use for micropellets and Blast Furnaces for pellets, which makes the difference with respect to the present invention where briquettes are made from pellet fines, DRI sludge, DRI fines and dusts from DRI dedusting systems in roll presses using bentonite and liquid sodium silicate as binders, and having the direct reduction plants as end use for the briquette.

Patent US 2005/0050996 A1 which describes a method for producing self-fluxing briquettes in a low pressure roller press from iron ore, specifically hematite, magnetite, goethite or mixtures of all crushed to sizes less than 4 mm and also mixed with a flux, preferably limestone, with a size less than 100 microns, briquettes obtained this way are called green briquettes and are then cured in a decoction furnace for 15-40 minutes at temperatures ranging from 1200 to 1380° C.; the end use of these cured briquettes are Blast Furnaces or direct reduction plants, which makes the difference with respect to the present invention where briquettes are made from pellet fines, DRI sludge, DRI fines and dusts from DRI dedusting systems in roller presses using bentonite and silicate liquid sodium as binders, the curing is performed in closed warehouses at room temperature and optionally in drying furnaces operating at 80-100° C., these briquettes having as end use the direct reduction plants

BRIEF SUMMARY OF THE INVENTION

The invention relates to a method for producing briquettes from pellet fines, DRI sludge, DRI fines and dust from DRI dedusting systems and, in this way, reincorporating same into steel production processes, thereby contributing to the re-use of the by-products of these processes, as well as minimizing the stocks of these types of materials and, consequently, helping to improve the environment. The invention comprises: grinding and sieving the pellet fines and the DRI sludge; sieving the DRI fines; storing the dust from DRI dedusting systems; briquetting with roller presses, using liquid sodium silicate and bentonite or composite Portland cement as binders; sieving the briquettes; shredding the edges and waste of the fresh briquettes; and curing in order to improve the physical properties thereof, such as strength. Once cured, the fresh briquette can be stored or sent directly to direct-reduced iron production processes for use as part of the feedstock for reduction ovens or reactors.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

The accompanying drawing figure shows a flow chart of the process for obtaining briquettes from pellet fines, DRI sludge, DRI fines and dusts from DRI dedusting systems disclosed herein.

DETAILED DESCRIPTION OF THE INVENTION

This invention refers to a process for producing briquettes from the following materials which are byproducts of the steel industry;

Pellet fines; Obtained from the screening of iron oxide pellets used as load to the Blast Furnaces or Direct Reduction reactors.

DRI sludge; Obtained from dust collection systems by washing of gases in the feeding area and the reaction area of the Direct Reduction reactors.

DRI fines; Obtained from the screening of Direct Reduction Iron (DRI).

Dusts from the DRI dedusting system; Obtained in the dust emission control systems from equipment handling or carrying the Direct Reduction Iron or DRI.

The end use of the briquettes is to partially replace the load of iron oxide pellets in the Direct Reduction reactors both HyL and Midrex for their physical, chemical and metallurgical characteristics for the final production of Direct Reduction Iron (DRI) and which comprises the following stages;

a) Screening and Crushing of Pellet Fines

Pellet fines are screened by a mesh with an opening size from ⅛ inches (3.17 mm) up to ¼ inches (6.35 mm) to obtain primary pellet fine particles smaller than the chosen screening hole size (from ⅛ inches up to ¼ inches), which are placed on a conveyor belt, and the pellet fine particles larger than the chosen screening hole size are crushed preferably with a jaw crusher (1) to obtain secondary pellet fine particles smaller than the chosen screening hole size which are then placed together with primary pellet fine particles smaller than the chosen screening hole size (from ⅛ inches up to ¼ inches) on the conveyor and obtain final pellet fine particles smaller than the chose screening hole size.

Particles larger than ¼ inches (6.34 mm) or even 3/16 (4.76 mm) are set aside for use as load in the Direct Reduction reactor.

b) Screening and Crushing of DRI Sludge

DRI sludge with humidity lower than 10% and preferably lower than 5% are screened by a mesh with an opening size of ¼ inches (4.76 mm) to obtain primary DRI sludge particles smaller than ¼ inches (4.76 mm), which are placed on a conveyor belt, and the DRI sludge particles larger than ¼ inches (4.76 mm) are crushed preferably with a jaw crusher (2) to obtain secondary DRI sludge particles smaller than ¼ inches (4.76 mm) which are then placed together with primary DRI sludge particles smaller than ¼ inches (4.76 mm) on the conveyor and obtain final DRI sludge particles smaller than ¼ inches (4.76 mm).

c) Screening of DRI Fines

DRI fines are materials that have already gone through a screening process in the plant that generates them and, to ensure uniformity in size, are screened again by a mesh (3) with an opening size of ¼ inches (6.34 mm) to obtain final DRI fine particles smaller than ¼ inches (6.34 mm), which are placed on a conveyor belt for use in the briquetting process, and DRI fine particles larger than ¼ inches (6.34 mm) are set aside for use as load in Electric Mill furnaces.

d) Storage of Dusts from DRI Dedusting Systems

Dusts from DRI dedusting systems are stored in hoppers or silos (4) so that, using a dosing system, are then used in the briquetting process.

e) Mixing of Final Pellet Fine Particles, DRI Sludge, DRI Fines and Dusts from DRI Dedusting Systems with Binders The final pellet fine particles smaller than the chosen screening hole size (from ⅛ inches up to ¼ inches), of DRI sludge smaller than ¼ inches, DRI fines smaller than ¼ inches and dusts from DRI dedusting systems are mixed with liquid and dust binders, preferably 1 to 12% for the liquid sodium silicate (5) and preferably 1 to 10% for dust bentonite (6) and the necessary water (7) to obtain proper moisture in a mixer, preferably in a horizontal twin-shaft mixer (8), to obtain a final blend to be used in the briquetting stage. The combination of these liquid and dust binder provides the briquette produced with the characteristics of porosity and physical strength for a favorable performance in Direct Reduction reactors both HyL and Midrex.

Optionally only final pellet fine particles smaller than the chosen screening hole size (from ⅛ inches up to ¼ inches) and DRI sludge smaller than ¼ inches are mixed in proportions from 10% pellet fines-90% DRI sludge to 90% pellet fines-10% DRI sludge with liquid and dust binders to obtain a final mixture to be used in the briquetting stage.

Optionally, composed Portland cement and/or hydrated lime are used as binder preferably 1 to 10% instead of dust bentonite.

f) Briquetting of the Final Mixture of Pellet Fine Particles, DRI Sludge, DRI Fines, Dusts from DRI Dedusting Systems and Liquid and Dust Binders The final mixture obtained is passed to a feeder hopper of a roller press (9) to be briquetted with a specific compression force by a system of hydraulic pistons preferably 0-147 kN/cm roller linear (equivalent to 0-15 tonf/cm roller linear) thus obtaining fresh spheroidal or oval briquettes preferably with a diameter smaller than 3.6 cm at widest and with a volume preferably lower than 10 cm3.

g) Screening of Fresh Briquettes

Fresh spheroidal briquettes pass through an inclined vibrating screen (10) of one bed with an opening of ¼ inches for removing edges and waste from fresh briquettes smaller than ¼ inches (6.34 mm) in order to obtain a fresh screened briquette. The edges and waste of fresh briquettes smaller than ¼ inches pass to a shredding system (11) and are then reintroduced to the feeding hopper of the roller press and briquetted with the final mixture in stage f).

h) Curing of Fresh Screened Briquettes.

Fresh screened briquettes are cured in closed warehouses (12) at ambient conditions for at least 24 hours to improve the strength properties, during which time briquettes acquire strength so they do not degrade during handling in order to obtain cured briquettes with a porosity of 18-30% in volume and preferably 21 to 25% in volume to improve their reduction properties inside the reactors of the processes of Direct Reduction iron production. The improvement in both strength and porosity properties affects the metallurgical behavior of the briquette so that industrial tests performed on HyL Direct Reduction reactors have yielded results of metallization greater than 92.5%, metallization meaning the percentage of metal Fe with respect the percentage of the total Fe obtained by processing these briquettes in Direct Reduction reactors.

Optionally fresh briquettes are cured rapidly in drying, grill-type furnaces operating at temperatures higher than the ambient, preferably 80 to 200° C. with a preferred time of permanence shorter than two hours, during which time cured briquettes are obtained with adequate strength for further handling.

The cured briquette is sent to the iron production processes of Direct Reduction both HyL and Midrex for consumption.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A process for obtaining briquettes from pellet fines, Direct Reduction Iron (DRI) sludge, DRI fines and dusts of DRI dedusting systems comprising the steps:
   A) screening and crushing of pellet fines;
   B) screening and crushing of DRI sludge;
   C) screening of DRI fines;
   D) storage of dusts from DRI dedusting systems;
   E) mixing the screened and crushed pellet fines, the screened and crushed DRI sludge, the screened DRI fines and the stored dusts from DRI dedusting systems with binders to form a mixture;
   F) briquetting of the mixture with both liquid and powder binders to form fresh briquettes;
   G) screening of the fresh briquettes; and
   H) curing of screened fresh briquettes;
   wherein the screened and crushed pellet fines in the mixture are in the form of particles that are smaller than ⅛ inch in diameter,
   wherein the screened and crushed DRI sludge in the mixture are in the form of particles that are smaller than ⅛ inch in diameter,
   wherein the screened DRI fines are in the form of particles that are smaller than ¼ inch in diameter,
   wherein said particles together with the stored dusts from the DRI dedusting systems are mixed with the liquid and powder binders and with water sufficient to achieve adequate moisture in a mixer so as to obtain the mixture used in the briquetting step, and
   wherein the mixture comprises from 1 to 12% by weight of sodium silicate as the liquid binder and from 1 to 10% by weight of bentonite powder or Portland cement as the powder binder.

2. The process according to claim 1, wherein a ratio of pellet fines to DRI sludge in the mixture is in a range from 10:90 to 90:10 by weight.

3. The process according to claim 1, wherein the powder binder is bentonite powder.

4. The process according to claim 1, wherein the powder binder is Portland cement.

5. The process according to claim 1, wherein the mixer is a horizontal double-axis mixer.

6. A process for obtaining briquettes from pellet fines, Direct Reduction Iron (DRI) sludge, DRI fines and dusts of DRI dedusting systems comprising the steps:
   A) screening and crushing of pellet fines;
   B) screening and crushing of DRI sludge;
   C) screening of DRI fines;
   D) storage of dusts from DRI dedusting systems;
   E) mixing the screened and crushed pellet fines, the screened and crushed DRI sludge, the screened DRI fines and the stored dusts from DRI dedusting systems with binders to form a mixture;
   F) briquetting of the mixture with liquid and powder binders to form fresh briquettes;
   G) screening of the fresh briquettes; and
   H) curing of screened fresh briquettes;
   wherein in step F), the mixture is fed into a feed hopper of a roller press to be briquetted with a compressive force up to 147 kN per cm linear roller to obtain fresh spheroidal type briquettes with a diameter of less than 3.2 cm and with a volume smaller than 7.5 cm$^3$.

7. The process according to claim 6, wherein in step G), the fresh spheroidal type briquettes pass over single, inclined deck with a vibrating screen having openings of ¼ inch to remove residues from the fresh spheroidal type briquettes that will pass through the screen, said residues being passed through a shredder and then being fed to the feed hopper of the roller press to be reincorporated in step F).

8. A process for obtaining briquettes from pellet fines, Direct Reduction Iron (DRI) sludge, DRI fines and dusts of DRI dedusting systems comprising the steps:
   A) screening and crushing of pellet fines;
   B) screening and crushing of DRI sludge;
   C) screening of DRI fines;
   D) storage of dusts from DRI dedusting systems;
   E) mixing the screened and crushed pellet fines, the screened and crushed DRI sludge, the screened DRI fines and the stored dusts from DRI dedusting systems with binders to form a mixture;
   F) briquetting of the mixture with liquid and powder binders to form fresh briquettes;
   G) screening of the fresh briquettes; and
   H) curing of screened fresh briquettes;
   wherein in step H) the screened fresh briquettes are cured in storage facilities at ambient conditions for at least 24 hours to improve strength properties, and
   wherein during the curing step the briquettes acquire strength so that they do not degrade during their handling and thus obtain cured briquettes with a porosity of 18 to 28% by volume to improve its reduction properties within reactors of direct reduction of iron production processes.

9. A process for obtaining briquettes from pellet fines, Direct Reduction Iron (DRI) sludge, DRI fines and dusts of DRI dedusting systems comprising the steps:
   A) screening and crushing of pellet fines;
   B) screening and crushing of DRI sludge;
   C) screening of DRI fines;
   D) storage of dusts from DRI dedusting systems;
   E) mixing the screened and crushed pellet fines, the screened and crushed DRI sludge, the screened DRI fines and the stored dusts from DRI dedusting systems with binders to form a mixture;
   F) briquetting of the mixture with liquid and powder binders to form fresh briquettes;
   G) screening of the fresh briquettes; and
   H) curing of screened fresh briquettes;
   wherein in step H) the screened fresh briquettes are cured in an accelerated form in drying furnaces with a mesh belt operating at higher than ambient temperatures, with a residence time of greater than 2 hours to improve strength properties, during which time cured briquettes are obtained with improved handling strength.

* * * * *